United States Patent [19]

Lindrose

[11] Patent Number: 6,028,739
[45] Date of Patent: Feb. 22, 2000

[54] DISC CLAMPING SYSTEM WITH A DUAL ACTION SPRING RATE

[75] Inventor: Albert Michael Lindrose, Boulder, Colo.

[73] Assignee: Seagate Technology, Inc., Scotts Valley, Calif.

[21] Appl. No.: 08/932,752

[22] Filed: Sep. 17, 1997

Related U.S. Application Data

[60] Provisional application No. 60/027,427, Dec. 5, 1996, and provisional application No. 60/027,428, Dec. 5, 1996.

[51] Int. Cl.$^7$ .................................................. G11B 17/02
[52] U.S. Cl. ..................................... 360/99.12; 360/98.08
[58] Field of Search ............................. 360/98.01, 97.01, 360/98.07–99.01, 99.04, 99.08–99.12; 369/270, 271

[56] References Cited

U.S. PATENT DOCUMENTS

| 4,561,035 | 12/1985 | McDorman et al. | 360/137 |
| 5,295,030 | 3/1994 | Tafreshi | 360/99.12 |
| 5,333,080 | 7/1994 | Ridinger et al. | 360/99.12 |
| 5,528,434 | 6/1996 | Bronshvatch et al. | 360/98.08 |

FOREIGN PATENT DOCUMENTS 3-062379  3/1991  Japan .

*Primary Examiner*—William J. Klimowicz
*Attorney, Agent, or Firm*—Edward P. Heller, III; Raghunath S. Minisandram

[57] ABSTRACT

A disc clamping system which exhibits a dual spring rate. The first spring rate is relatively low, allowing the disc clamping system to compensate for variations in dimensional tolerance buildup in the components of the disc stack, and is exhibited by the disc clamping system during initial tightening of the screws used to mount the disc clamp. The second spring rate is relatively high to provide tolerance to mechanical shocks applied in the disc drive's Z-axis, and is exhibited by the disc clamping system when the screws mounting the disc clamp to the spindle motor hub are tightened to a point of contact between contact features on the disc clamp and spindle motor hub.

34 Claims, 6 Drawing Sheets

DISC CLAMPING SYSTEM WITH A DUAL ACTION SPRING RATE

CROSS REFERENCE TO RELATED APPLICATIONS

This application claims the benefit of United States Provisional Applications Ser. No. 60/027,427 and Ser. No. 60/027,428, both filed Dec. 5, 1996, and is related to co-pending U.S. patent application Ser. No. 08/931,924, filed simultaneously with this application.

FIELD OF THE INVENTION

This invention relates generally to the field of hard disc drive data storage devices, and more particularly, but not by way of limitation, to an improved disc clamping system for securing the discs of the disc drive to the hub of the spindle motor used to rotate the discs.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which are used wherever their users happen to take them. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding mechanical shocks of 200 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that provides sufficient clamping force to prevent shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued Jun. 18, 1996, U.S. Pat. No. 5,517,376, issued May 14, 1996, U.S. Pat. No. 5,452,157, issued Sep. 19, 1995, U.S. Pat. No. 5,333,080, issued Jul. 26, 1994, U.S. Pat. No. 5,274,517, issued Dec. 28, 1993 and U.S. Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

One type of disc clamp which is used extensively in the industry is the so-called "spring-type" clamp. A spring-type clamp is typically formed of sheet spring material stamp-formed to provide both mounting and force-application features, and commonly consists of three major portions: 1) a central mounting portion; 2) a spring portion extending radially outward from the central mounting portion and; 3) a contact portion adjacent the outer diameter of the spring-type clamp.

While spring-type disc clamps have been seen which employ a single, centrally located mounting screw, it is much more common to utilize a plurality of screws evenly spaced about a diameter just inside the outer diameter of the web portion of the disc clamp. The use of multiple mounting screws placed close to the spring portion provides greater overall clamping force than a single central mounting screw, given the same configuration of the remainder of the disc clamp.

The central mounting portion, also sometimes referred to as a web, typically includes one or more screw holes through which machine screws are inserted into corresponding tapped holes in the upper surface of the spindle motor hub. It is also typical for the web to include an arrangement of tooling holes, aligned with corresponding tooling holes in the upper surface of the spindle motor hub, which are engaged by an assembly tool to maintain the relative position of the spindle motor and disc clamp while the screws used to mount the disc clamp are tightened.

The radially extending spring portion is commonly formed at an angle to the plane of the central mounting portion of the disc clamp, and acts, when the web is displaced into contact with the top of the spindle motor hub, similarly to a "belleville" spring to determine the amount of clamping force applied to the top surface of the uppermost disc in the disc stack.

The contact portion of a typical spring-type disc clamp is a circumferentially formed corrugation at the outermost extent of the spring portion. The corrugation is first formed downward, toward the disc surface, and then back upward, thus forming a contact portion which is substantially circular in section at a fixed diameter from the spin axis of the disc stack, and producing a perimeter wall at the outer extreme of the disc clamp.

One problem encountered in the design of spring-type disc clamps relates to the inescapable build up of dimensional tolerances in the components that make up the disc stack. The combined thickness of the discs and disc spacers in the disc stack has a nominal value which, in combination with the nominal dimension from the top surface of the disc mounting flange on the hub of the spindle motor to the top surface of the hub of the spindle motor, defines the nominal relationship between the top surface of the uppermost disc in the disc stack and the top surface of the hub of the spindle motor. This relationship also determines the amount of displacement that the spring-type disc clamp undergoes during assembly, and thus also determines the amount of clamping force exerted on the disc stack.

Disc clamps of the prior art typically operate with a single spring rate, and the tolerance buildup variation noted above leads to a comparable variation in the amount of clamping force exerted across a number of disc drive units, with disc stacks made up of larger numbers of discs and disc spacers having a potentially larger amount of dimensional tolerance buildup extremes. If the desired amount of clamping force is established by the nominal relationship between the top surface of the uppermost disc in the disc stack and the top surface of the spindle motor hub, then units exhibiting extremes of dimensional tolerance buildup will provide either excessive clamping force—potentially leading to distortion of the uppermost disc—or provide severely reduced clamping force. If the clamping force is too low, then the disc drive may not meet specified limits of mechanical shock or thermal variation, and may allow the discs to be shifted from their intended relationship with the spindle motor hub.

Changing the single spring rate of prior art disc clamps from the nominal value serves only to exacerbate the above-described problem at one or the other extreme of dimensional tolerance variation.

A second problem with disc clamping systems using spring-type disc clamps having a single spring rate lies in their reaction to the application of mechanical shocks in parallel with the spin axis of the spindle motor, commonly referred to as "Z-axis shocks". When Z-axis shocks are applied to the disc drive, the mass of the disc stack components acts inertially against the spring force of the disc clamp. If the relatively low spring rate of typical prior art disc clamps (selected, as noted above, to compensate for variations in the dimensions of the disc stack components) acts in resonance with the mass of the disc stack components, axial unloading of the disc stack can occur. To counter this tendency, it is desirable to provide a disc clamp having a high spring rate.

Prior art spring-type disc clamps are not capable of providing a low spring rate to compensate for disc stack dimensional tolerance build up and a high spring rate to increase tolerance to Z-axis applied mechanical shocks.

The need clearly exists, therefore, for a disc clamping system for a disc drive that compensates for dimensional tolerance buildup in the components of the disc stack, and thus exerts a uniform nominal clamping force across units having disc stacks with a wide variation in dimensional ranges, and that also provides a high tolerance of Z-axis shocks.

SUMMARY OF THE INVENTION

The present invention is a disc clamping system which exhibits a dual spring rate. The first spring rate is relatively low, allowing the disc clamping system to compensate for variations in dimensional tolerance buildup in the components of the disc stack, and is exhibited by the disc clamping system during initial tightening of the screws used to mount the disc clamp. The second spring rate is relatively high to provide tolerance to mechanical shocks applied in the disc drive's Z-axis, and is exhibited by the disc clamping system when the screws mounting the disc clamp to the spindle motor hub are tightened to a final assembled condition defined by contact between contact features on the disc clamp and spindle motor hub.

It is an object of the invention to provide a disc clamping system for securing the components of a disc stack to the hub of a spindle motor in a disc drive.

It is another object of the invention to provide a disc clamping system which exhibits a dual spring rate.

It is another object of the invention to provide a disc clamping system which can be produced at costs comparable to prior art disc clamping systems.

The manner in which these objects are achieved, as well as other features and benefits of the invention, can best be understood by a review of the following DETAILED DESCRIPTION OF THE INVENTION, when read in conjunction with an examination of the accompanying drawings.

DETAILED DESCRIPTION OF THE INVENTION

Figure 1:
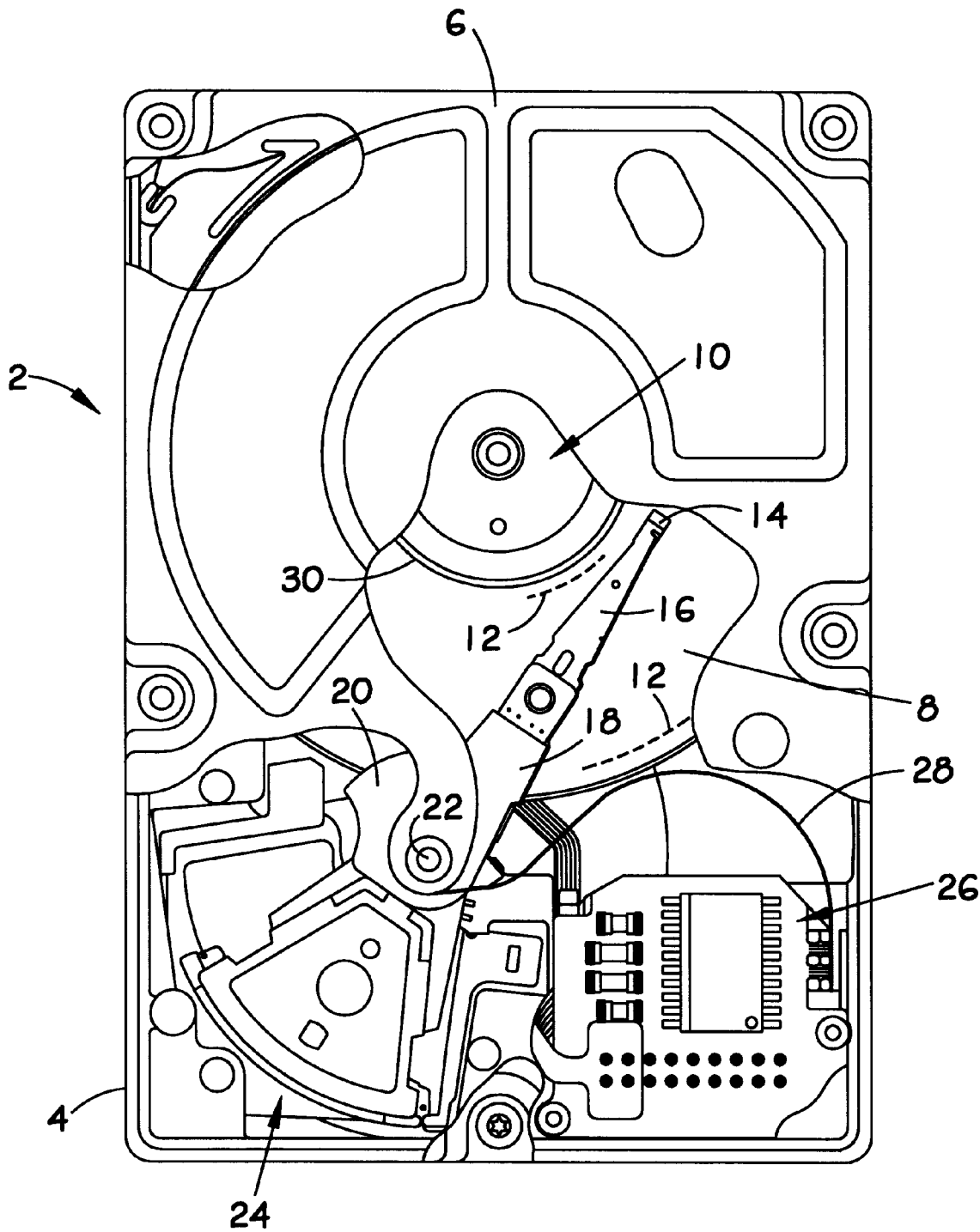
FIG. 1 is a top plan view of a prior art disc drive in which the present invention is particularly useful.

Turning now the drawings and specifically to FIG. 1, shown is a plan view of a disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

A disc clamp 30 used to secure the discs 8 is also shown the FIG. 1. The disc clamp 30 is of a prior art type which uses a single central screw to attach the disc clamp 30 to the hub of the spindle motor.

Figure 2:
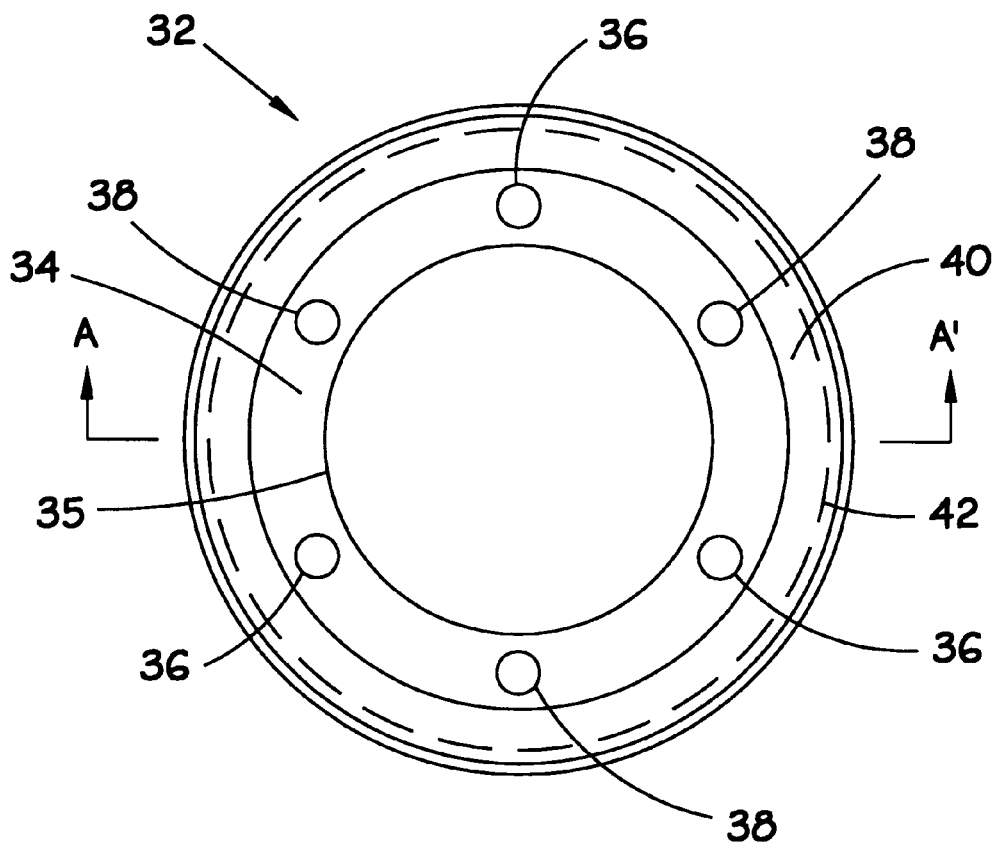
FIG. 2 is a top plan view of a typical prior art disc clamp employing multiple mounting screws.

Turning now to FIG. 2, shown is a plan view of a typical prior art disc clamp 32 which uses a plurality of screws for mounting to the hub (not shown) of the spindle motor. In the figure, it can be seen that the disc clamp 32 includes a central mounting portion, or web 34, which is dimensioned to overlay the top surface of the spindle motor hub, and which includes a central opening 35. This web 34 includes a plurality of screw holes 36 through which screws (not shown) are inserted and screwed into corresponding tapped holes in the upper surface of the spindle motor hub. In the example prior art disc clamp shown in the figure, there are three screw holes 36. A person of skill in the art will realize, however, that the number of screws used to mount the disc clamp 32 will be dependent on design requirements.

FIG. 2 also shows a plurality of tooling holes 38 in the web 34 of the disc clamp 32. These tooling holes 38 align with similarly spaced tooling holes in the spindle motor hub and are used with an assembly tool (not shown) during the manufacturing process to hold the disc clamp 32 in alignment with the spindle motor hub and prevent the spindle motor from rotating while the screws used to secure the disc clamp 32 are tightened, all in a manner well known in the art.

In FIG. 2, it can also be seen that the disc clamp 32 includes a spring portion 40 extending radially outward from the web 34 to a circular contact surface, represented by dashed line 42. The configuration of the spring portion 40 and contact surface 42 can perhaps best be appreciated from an examination of FIG. 3.

Figure 3:
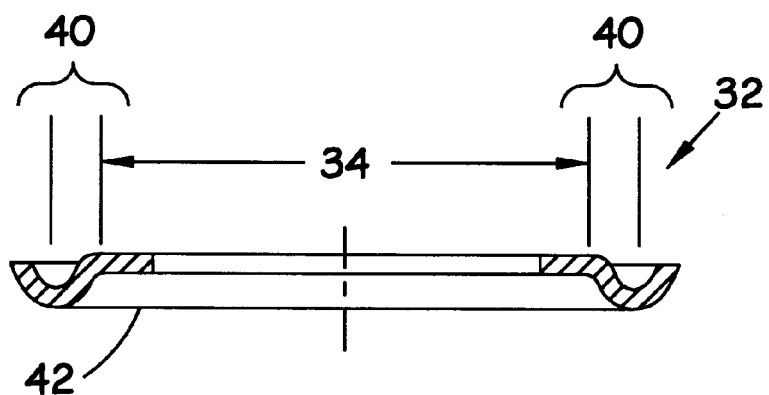
FIG. 3 is a sectional elevation view of the prior art disc clamp of FIG. 2 taken along line A-A' of FIG. 2.

FIG. 3 is a sectional elevation view of the prior art disc clamp 32 of FIG. 2 taken along line A-A' of FIG. 2. In the figure, it can be seen that the web 34 forms a substantially flat central region, and that the spring portion 40, extending from the outer extent of the web 34 to the circular contact surface 42, is formed out-of-plane from the web 34. In actual practice, the vertical dimension from the bottom of the web 34 to the contact surface 42 will be greater by some selected amount than the vertical height from the top surface of the uppermost disc in the disc stack to the top surface of the spindle motor hub. Thus, when screws are inserted through the screw holes (36 in FIG. 2) and tightened into engagement with corresponding tapped holes in the spindle motor hub, the web 34 will be displaced downward relative to the contact surface 42, deforming the spring portion 40 and applying clamping force to the uppermost disc along the circular contact surface 42 of the disc clamp 32.

A person of skill in the art will appreciate that the prior art disc clamp 32 of FIGS. 2 and 3 exhibits a single spring rate. That is, since the spring portion 40 is the only portion of the disc clamp which controls the amount of clamping force, the disc clamp 32 exhibits a single spring rate from the point at which the screws used to mount the disc clamp first contact the upper surface of the disc clamp 32 until the point is reached where the web 34 of the disc clamp 32 contacts the top of the spindle motor. While the particular spring rate of the disc clamp 32 can be determined by altering the material, dimensions and relative geometry of the disc clamp, the resultant disc clamp will still exhibit a single spring rate, although greater or lesser dependent on the changes made. The problems inherent in disc drives using such single-spring-rate disc clamps can best be appreciated by an examination of FIGS. 4 and 5.

Figure 4:
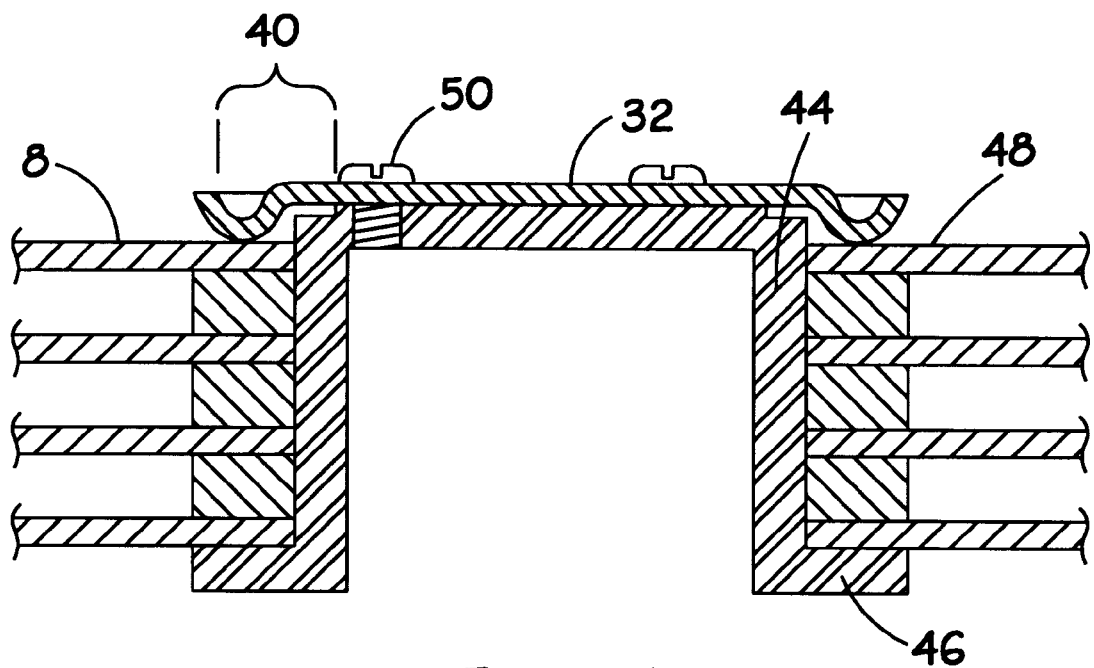
FIG. 4 is a simplified sectional elevation view of a prior art disc stack and spindle motor hub assembly, showing component relationships.

FIG. 4 is a sectional elevation view of the components that make up a disc stack which is assembled with a prior art single-spring-rate disc clamp 32, such as that described above in relationship to FIGS. 2 and 3 above. As can be seen in the figure, the disc stack is mounted on the hub 44 of a spindle motor. The electrical and magnetic components that make up the spindle motor are typically located in the open inner portion of the hub 44, as is well known in the art.

The spindle motor hub 44 includes a radially extending disc mounting flange 46 at its lower extremity. A plurality of discs, one of which is identified with the numerical designator 8, is placed over the spindle motor hub 44 and separated by an appropriate number of disc spacers 48. While the example assembly of FIG. 4 shows a disc stack comprising four discs 8 and three disc spacers 48, the person of skill in the art will appreciate that this configuration is for illustrative purposes only, and that the ensuing discussion applies also to disc drives which incorporate both greater and lesser numbers of discs 8 and disc spacers 48.

FIG. 4 also shows that the disc clamp 32 is mounted to the spindle motor hub by a plurality of machine screws, one of which is identified with the numerical designator 50, inserted into corresponding tapped holes (not designated) in the upper surface of the spindle motor hub 44. From the figure, it is apparent that the only elements controlling the amount of clamping force exerted on the disc stack is the spring portion 40 of the disc clamp 32, and the amount of displacement applied to the web (34 in FIGS. 2 and 3) by the screws 50 as they are screwed into the spindle motor hub. The effect of this limitation in prior art disc clamping systems is best seen in FIG. 5.

Figure 5:
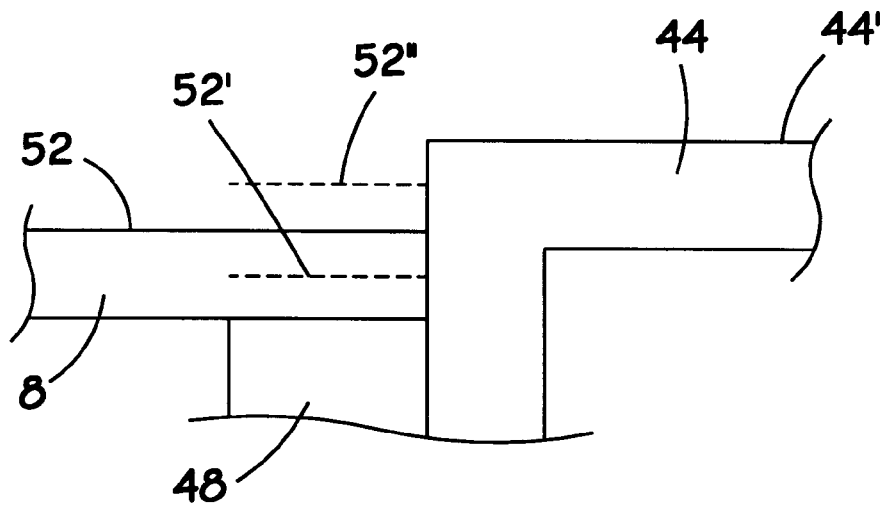
FIG. 5 is a detail view of a portion of the prior art disc stack of FIG. 4 showing the effect of dimensional tolerance buildup in the disc stack.

FIG. 5 is a detail view of a disc stack, such as that shown in FIG. 4, illustrating the relationship of specific disc stack components. FIG. 5 shows a portion of a spindle motor hub 44, an uppermost disc 8 in a disc stack and a disc spacer 48. One of skill in the art will appreciate that this same relative relationship would be present in a disc drive incorporating a single disc 8 if the disc spacer 48 were replaced by a disc mounting flange, such as the disc mounting flange 46 of FIG. 4.

As previously mentioned, with prior art single-spring-rate disc clamps, such as the disc clamp 32 of FIGS. 2, 3 and 4, the amount of clamping force applied to the disc stack is determined by the relationship between the top surface 44' of the spindle motor hub 44 and the upper surface 52 of the uppermost disc 8 in the disc stack, with the intended design clamping force being applied to the disc stack when the discs 8, disc spacers 48 and vertical dimension from the disc mounting flange to the top surface 44' of the spindle motor hub 44 all have nominal designed dimensions. However, unavoidable manufacturing tolerances in these components can lead to unintended changes in the component relationships.

For instance, if all of the discs 8 and disc spacers 48 in the disc stack have vertical dimensions at the low end of their allowable tolerance range and the vertical dimension from the disc mounting flange to the top surface 44' of the spindle motor hub 44 is at the upper end of its tolerance range, the location of the upper surface of the uppermost disc 8 would be displaced downward from its nominal position relative to the top surface 44' of the spindle motor 44, as represented by dashed line 52' in FIG. 5. Such an increase in vertical displacement from the upper surface of the uppermost disc 8 to the top surface 44' of the spindle motor 44 would lead to decreased displacement of the web portion of the disc clamp during assembly, and correspondingly decreased clamping force applied to the disc stack.

Similarly, if all of the discs 8 and disc spacers 48 in the disc stack have vertical dimensions at the high end of their allowable tolerance range and the vertical dimension from the disc mounting flange to the top surface 44' of the spindle motor hub 44 is at the lower end of its tolerance range, the location of the upper surface of the uppermost disc 8 would be displaced upward from its nominal position relative to the top surface 44' of the spindle motor 44, as represented by dashed line 52" in FIG. 5. Such a decrease in vertical displacement from the upper surface of the uppermost disc 8 to the top surface 44' of the spindle motor 44 would lead to increased displacement of the web portion of the disc clamp during assembly, and correspondingly increased clamping force applied to the disc stack.

While the extremes of dimensional tolerance buildup represented by dashed lines 52' and 52" have been exaggerated in FIG. 5 for illustrative purposes, persons of skill in the art will appreciate that such variations in applied clamping force can lead to associated problems with disc drive performance. For instance, if the clamping force applied to the disc stack is at the upper extreme described above, mechanical distortion of the uppermost disc in the disc stack may result, causing potential problems with the flying characteristics of the heads, and the performance of the read/write electronics.

Contrariwise, if the clamping force applied to the disc stack is at the lower extreme described above, there may not be sufficient clamping force to maintain the relative positions of the discs and spindle motor over specified ranges of applied mechanical shock. Such a situation is especially undesirable when mechanical shock is applied in a direction parallel with the spin axis of the disc stack. In such cases, the inertia of the disc stack components can cause further displacement of the spring portion of the disc clamp, allowing the discs to shift relative to the spindle motor hub.

It will also be apparent to one of skill in the art that the conditions described above will be most extreme in disc drives which incorporate a large number of discs and disc spacers, and thus include a larger number of components that can contribute to dimensional tolerance buildup.

In order to compensate for such dimensional tolerance buildup in the disc stack, it is common practice to design disc clamps which have a relatively low spring rate, thus providing a more uniform distribution of clamping force across units having widely varying total disc stack height. However, the use of disc clamps having low spring rates implies that the disc drive will be susceptible to mechanical shocks applied to the disc drive in parallel with the spin axis of the spindle motor, or, as commonly referred to in the industry, in the Z-axis. If the combined mass of the disc drive components is large enough, relative to the spring rate of the disc clamp, applied mechanical shocks in the Z-axis can be sufficient to overcome the clamping force of the disc clamp, and unload the disc stack components, allowing them to shift radially relative to the disc stack.

It is to these seemingly mutually exclusive design requirements—low spring rate for dimensional tolerance compensation and high spring rate for mechanical shock tolerance—that the present invention is directed.

FIGS. 6 through 13 illustrate the disc clamping system of the present invention, and will be discussed in turn to describe the advantages of the present invention over the prior art.

Figure 6:
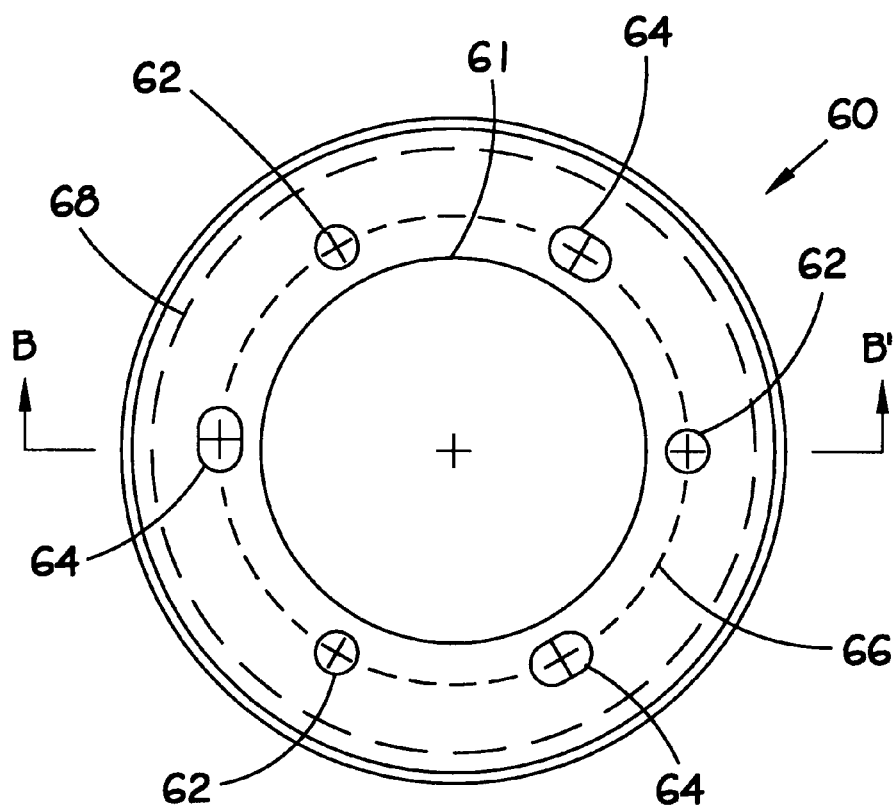
FIG. 6 is top plan view of a disc clamp made in accordance with the present invention.

Turning now to FIG. 6, shown is a plan view of a disc clamp 60 made in accordance with the present invention. As can be seen from the figure, the plan view of FIG. 6 is very similar to that of the prior art of FIG. 2.

The disc clamp 60 includes a central opening 61, and a plurality of screw holes 62 and tooling holes 64 lying on a common diameter 66. While in the example disc clamp 60 there are three screw holes 62 and three tooling holes 64, the person of skill in the art will appreciate that the scope of the present invention is not limited by the specific number of screw holes 62 or tooling holes 64, and is envisioned to include embodiments with various numbers of such openings.

The disc clamp 60 of FIG. 6 is also formed near its outer perimeter similarly to the prior art disc clamp of FIGS. 2 and 3. That is, a circular corrugation is formed near the outer diameter of the disc clamp 60 which creates a circular contact surface, represented in FIG. 6 by dashed line 68.

Figure 7:
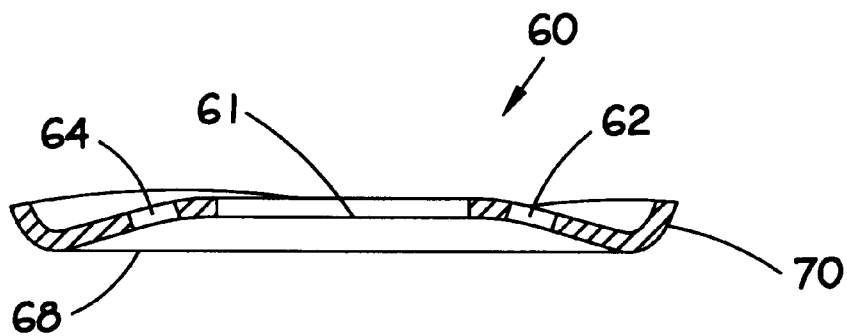
FIG. 7 is a sectional elevation view of the disc clamp of FIG. 6 taken along line B-B' of FIG. 6.

FIG. 7 is a sectional elevation view of the disc clamp 60 of FIG. 5 taken along line B-B' of FIG. 6. In FIG. 7, it is apparent that the spring portion of the disc clamp 60 is formed into the shape of a low-angle truncated cone from the central opening 61 outward, with the base of the cone adjacent the circular corrugation. That is, the material of the disc clamp 60 is formed downward out-of-plane from the central opening 61 to the peripheral circular corrugation that forms the circular contact surface 68. This means, when the disc clamp 60 is secured to the spindle motor hub as will be described in detail below, that the entire radial extent of the disc clamp 60 from the central opening 61 to the contact surface 68 serves as the spring portion of the disc clamp 60 during initial tightening of the mounting screws, and provides the first of the dual spring rates which are key to the invention, and which will also be described in detail below.

The outermost extreme of the disc clamp 60 is formed upward from the contact surface 68 to form a perimeter wall 70 that, similar to the configuration of FIGS. 2 and 3, serves to stiffen the disc clamp 60 near its outer edge. The perimeter wall of the particular disc clamp 60 shown includes a perimeter wall 70 having a circumferentially varying wall height. This feature of the disc clamp 60 is not a part of the present invention and is described in detail in co-pending application Ser. No. 08/931,924, filed coincidentally with the present application.

Figure 8:
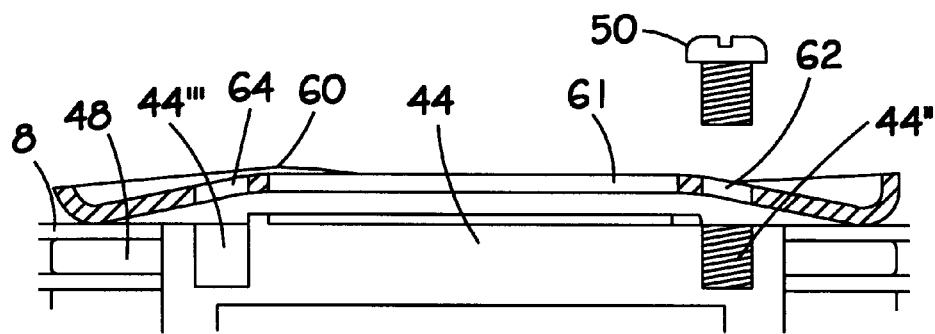
FIG. 8 is a sectional elevation view of a portion of a disc drive incorporating the disc clamping system of the present invention, showing the disc clamp in its unloaded condition.
Figure 9:
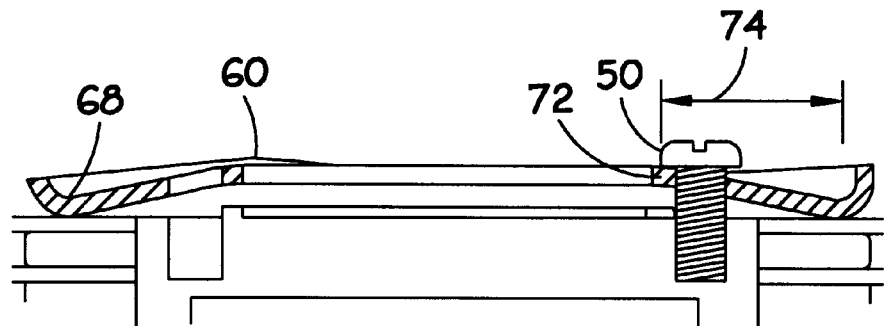
FIG. 9 is a sectional elevation view of a portion of a disc drive incorporating the disc clamping system of the present invention, showing the disc clamp as loading force is initially applied by mounting screws.
Figure 10:
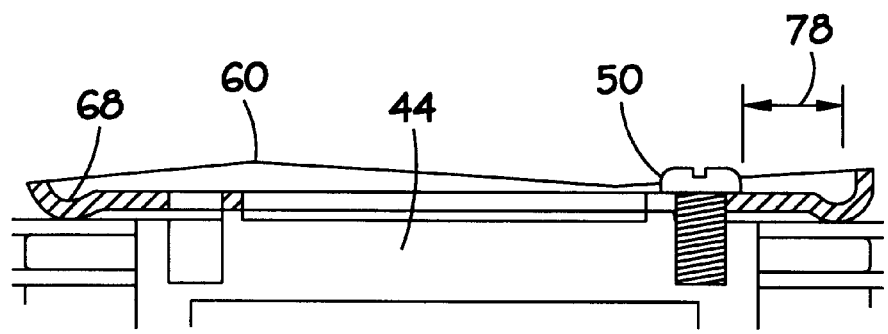
FIG. 10 is a sectional elevation view of a portion of a disc drive incorporating the disc clamping system of the present invention, showing the disc clamp in its fully loaded or operational condition.

FIGS. 8, 9 and 10 show the unique features of the inventive disc clamp 60 of FIGS. 6 and 7 as they relate to other elements of the clamping system and the disc stack. Specifically, FIG. 8 shows the disc clamp 60 and a portion of a spindle motor hub 44, along with two discs 8 and disc clamps 48. The disc clamp 60 is shown as it is positioned in contact with the uppermost disc 8 in the disc stack before the mounting screws, one of which is shown and identified with the numerical designator 50, are inserted through the screw holes 62 and into the tapped holes 44" in the spindle motor hub 44.

FIG. 8 also shows one of the tooling holes 64 in the disc clamp 60, and the corresponding tooling hole 44''' in the spindle motor hub 44.

FIG. 9 shows the mounting screw 50 when it has been engaged in the tapped hole in the spindle motor hub to a point of initial contact with the disc clamp 60. As can be seen in the figure, initial contact is made between the innermost diameter of the screw head and the disc clamp at a point closely adjacent the outer extent of the central opening in the disc clamp 60, at the point identified by numerical reference 72. It is apparent from the figure that further tightening of the screw 50 will apply pressure on the disc clamp 60 only at this contact point 72, and that the spring rate of the disc clamp during this initial tightening of the mounting screws 50 will be determined by the radial dimension 74 from the contact point 72 to the disc clamp contact surface 68.

FIG. 10 shows the clamping system of the invention once the mounting screws 50 have been tightened to their intended maximum extent. As can be seen in the figure, this final assembled condition of the disc stack brings the spring portion of the disc clamp 60 into a substantially parallel relationship with the upper surface of the spindle motor hub 44, and captures the disc clamp 60 between the inner extent of the screw head and a hub contact feature 76 formed integrally with the spindle motor hub 44. This hub contact feature 76 can be formed as a continuous raised surface about the entire circumference of the disc clamp 60 or as local features near the screw locations. Alternatively, a plurality of discrete hub contact features 76 can be positioned at desired locations about the disc clamp circumference to assist in providing even distribution of the clamping force applied at the disc clamp contact surface 68.

Once the screws 50 have been brought into the final assembly condition of FIG. 10, the radial extent of the spring portion of the disc clamp is defined by the contact between the outer extent of the screw head and the disc clamp 60, and, as can be seen in the figure, has been shortened to the dimension designated by numerical reference 78. The spring rate of the disc clamp 60 across spring length 78 is significantly greater than the spring rate exhibited during initial tightening of the screws 50 as previously shown by spring length 74 in FIG. 9. Thus, the disc clamping system of the invention provides a first relatively low spring rate during initial assembly to provide compensation for dimensional tolerance variations in the disc stack, and a second relatively high spring rate in its final assembled condition to provide a high clamping force to maintain the discs in their intended relationship to the spindle motor without causing mechanical distortion of the discs.

In a specific implementation of the invention, a disc clamp for a 3.5" disc drive was fabricated from series 301 half-hardened stainless steel 0.0177"±0.0005" thick. The disc clamp was designed with a large central opening 61, three screw holes 62 and three tooling holes 64, such as that shown in FIG. 6. A person of skill in the art will appreciate, however, that selections of material, number of screw holes and other dimensional and geometric determinations will be a function of the specific disc drive in which the disc clamping system of the invention is implemented, and such considerations should not, therefore, be considered as limiting to the scope of the invention.

Figure 11:
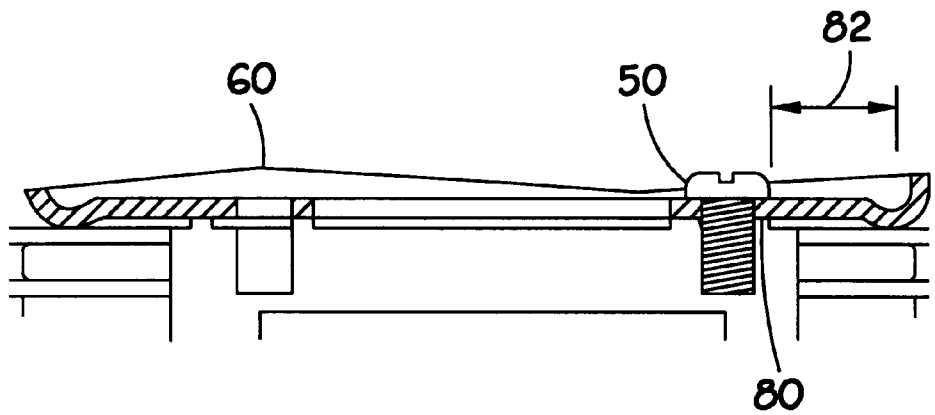
FIG. 11 is a sectional elevation view of a portion of a disc drive incorporating a second embodiment of the disc clamping system of the present invention, showing the disc clamp in its fully loaded or operational condition.
Figure 12:
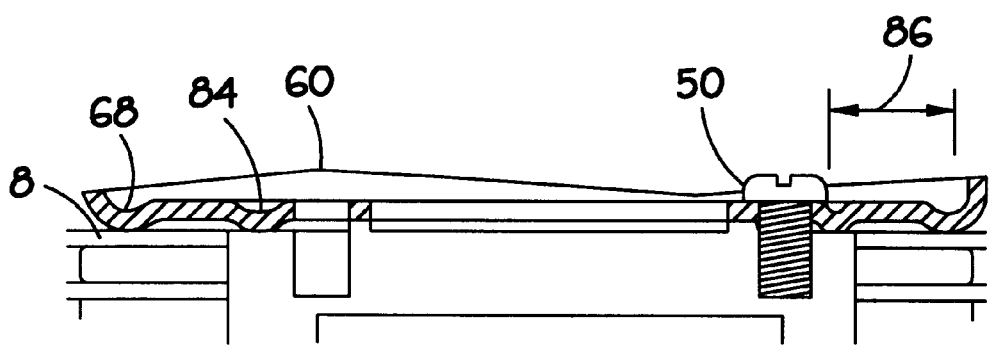
FIG. 12 is a sectional elevation view of a portion of a disc drive incorporating a third embodiment of the disc clamping system of the present invention, showing the disc clamp in its fully loaded or operational condition.
Figure 13:
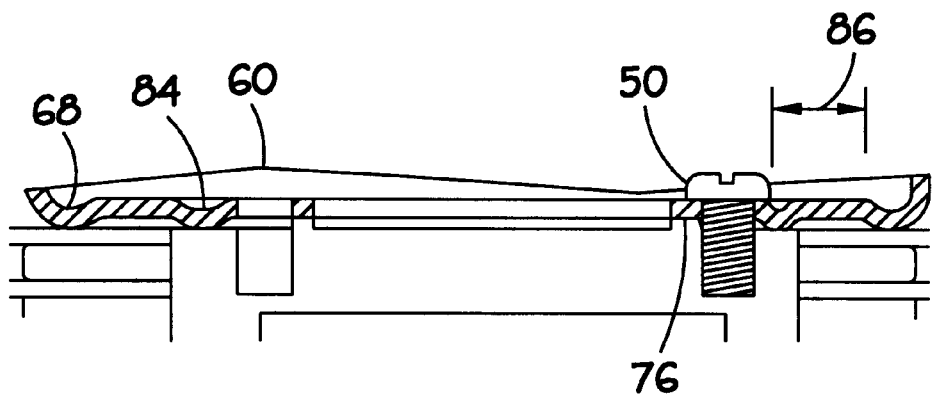
FIG. 13 is a sectional elevation view of a portion of a disc drive incorporating a fourth embodiment of the disc clamping system of the present invention, showing the disc clamp in its fully loaded or operational condition.

FIGS. 11, 12 and 13 show alternative embodiments of the disc clamping system of the present invention.

In the embodiment of FIG. 11, the hub contact feature 80 has been relocated radially outward from the location of the mounting screws 50. This configuration operates as the previously described embodiment of FIGS. 8 through 10 during initial tightening of the mounting screws 50, and again provides a shortened radial dimension 82 for the effective spring length once complete tightening of the mounting screws 50 is accomplished.

FIG. 12 shows another embodiment of the disc clamping system of the present invention in which the disc clamp 60 has been modified to include a second contact feature 84 which limits the displacement of the disc clamp 60 during final assembly. This disc clamp second contact feature 84 can be formed as a complete circumferential corrugation, similar to the contact surface 68 which bears on the uppermost disc 8 in the disc stack, or can be formed only locally at positions desired, again to contribute to even distribution of the clamping force applied to the disc stack at the contact surface 68. As described above in the discussion of FIG. 9, the disc clamping system of FIG. 12 has a first spring rate during initial tightening of the mounting screws 50 and a second higher spring rate determined by the radial dimension 86 between the second contact feature 84 and the disc clamp contact surface 68.

FIG. 13 shows yet another embodiment of the disc clamping system of the present invention in which the disc clamp 60 includes a secondary contact feature 84 similar to that of FIG. 12, and the spindle motor hub also includes a hub contact feature similar to that of FIG. 10. Once again, the first spring rate of the disc clamping system is established as described above in the discussion of FIG. 9, and the second spring rate is established by the radial dimension 86 between the second contact feature 84 and the contact surface 68 of the disc clamp.

Control of the values of the first and second spring rates of the disc clamping system of the present invention, as well as their relative relationship, is established by selection of the disc clamp material and the dimensions and geometry of the disc clamp features, and the location of the contact features on the disc clamp itself or on the spindle motor hub. The incorporation of contact features on the hub, such as contact features 76 and 80 in FIGS. 10, 11 and 13, and on the disc clamp, such as second contact features 84 in FIGS. 12 and 13, requires a minimum additional cost for manufacturing tooling and involves no additional assembly steps. Therefore, the present invention can be implemented with minimal cost impact on the disc drive.

From the foregoing, it is apparent that the present invention is particularly well suited and well adapted to achieve the objects set forth hereinabove, as well as possessing other advantages inherent therein. While particular embodiments of the present invention have been disclosed, certain variations and modifications which fall within the envisioned scope of the invention may be suggested to one of skill in the art upon reading this disclosure. Therefore, the scope of the present invention should be considered to be limited only by the following claims.

What is claimed is:

1. A disc drive including a disc stack, made up of at least one disc, mounted for rotation on a hub of a spindle motor, the disc drive also including a disc clamping system for securing the disc stack to the hub of the spindle motor, the disc clamping system comprising:

a plurality of tapped holes in the upper surface of the spindle motor hub, a disc clamp comprising:

a central opening, a circular corrugation closely adjacent the outer diameter of the disc clamp, the circular corrugation forming a circular contact surface for engaging the disc stack, a spring portion extending radially from the central opening outward to the circular corrugation, the spring portion being formed as a low-angle truncated cone having its base adjacent the circular corrugation, a plurality of screw holes in the spring portion arranged for cooperation with the tapped holes in the spindle motor hub, a plurality of screws passing through the screw holes in the disc clamp and into engagement with the tapped holes in the spindle motor hub, the screws having screw heads which include initial contact points with the spring portion of the disc clamp at their innermost diameters of the screw heads relative to the disc clamp, and at least one contact feature lying radially between the central opening and the circular contact surface for limiting displacement of the spring portion relative to the spindle motor hub, the spring portion having a first spring rate determined substantially by a radial dimension, relative to the disc clamp, between the initial contact points of the screw heads and the circular contact surface during initial installation of the screws, and the spring portion having a second spring rate, greater than the first spring rate, when the disc clamp is brought into a final assembled condition defined by the displacement limit of the contact feature.

2. A disc drive as claimed in claim 1, wherein the at least one contact feature is a portion of the spindle motor hub.

3. A disc drive as claimed in claim 2 wherein the contact feature is an annular raised surface on the spindle motor hub.

4. A disc drive as claimed in claim 3 wherein the contact feature is located radially between the central opening of the disc clamp and the screw holes in the disc clamp.

5. A disc drive as claimed in claim 3 wherein the contact feature is located radially between the screw holes of the disc clamp and the contact surface of the disc clamp.

6. A disc drive as claimed in claim 2 wherein the contact feature is a plurality of raised elements located circumferentially relative to the screw holes in the disc clamp.

7. A disc drive as claimed in claim 6 wherein the plurality of raised elements is located radially between the central opening of the disc clamp and the screw holes of the disc clamp.

8. A disc drive as claimed in claim 6 wherein the plurality of raised elements is located radially between the screw holes of the disc clamp and the contact surface of the disc clamp.

9. A disc drive as claimed in claim 1 wherein the at least one contact feature is a portion of the disc clamp.

10. A disc drive as claimed in claim 9 wherein the contact feature is an annular raised surface on the disc clamp.

11. A disc drive as claimed in claim 10 wherein the contact feature is located radially between the central opening of the disc clamp and the screw holes in the disc clamp.

12. A disc drive as claimed in claim 10 wherein the contact feature is located radially between the screw holes of the disc clamp and the contact surface of the disc clamp.

13. A disc drive as claimed in claim 9 wherein the contact feature is a plurality of raised elements located circumferentially relative to the screw holes in the disc clamp.

14. A disc drive as claimed in claim 13 wherein the plurality of raised elements is located radially between the central opening of the disc clamp and the screw holes of the disc clamp.

15. A disc drive as claimed in claim 13 wherein the plurality of raised elements is located radially between the screw holes of the disc clamp and the contact surface of the disc clamp.

16. A disc drive as claimed in claim 1 wherein the at least one contact feature comprises a spindle hub contact feature integral to the spindle motor hub and a disc clamp contact feature integral to the disc clamp.

17. A disc drive as claimed in claim 16 wherein the spindle hub contact feature is radially located between the central opening of the disc clamp and the screw holes of the disc clamp, and the disc clamp contact feature is radially located between the screw holes in the disc clamp and the contact surface of the disc clamp.

18. A disc clamping system for securing one discs or more of a disc stack in a disc drive to a hub of a spindle motor, the disc clamping system comprising:

a plurality of tapped holes in the upper surface of the spindle motor hub, a disc clamp comprising:
  a central opening,
  a circular corrugation closely adjacent the outer diameter of the disc clamp, the circular corrugation forming a circular contact surface for engaging an uppermost disc of the disc stack,
  a spring portion extending radially from the central opening outward to the circular corrugation, the spring portion being formed as a low-angle truncated cone having its base adjacent the circular corrugation,
  a plurality of screw holes in the spring portion arranged for cooperation with the tapped holes in the spindle motor hub, a plurality of screws passing through the screw holes in the disc clamp and into engagement with the tapped holes in the spindle motor hub, the screws having screw heads which include initial contact points with the spring portion of the disc clamp at their innermost diameters of the screw heads relative to the disc clamp, and at least one contact feature lying radially between the central opening and the circular contact surface for limiting displacement of the spring portion relative to the spindle motor hub, the spring portion having a first spring rate determined substantially by a radial dimension, relative to the disc clamp, between the initial contact points of the screw heads and the circular contact surface during initial installation of the screws, and the spring portion having a second spring rate, greater than the first spring rate, when the disc clamp is brought into a final assembled condition defined by the displacement limit of the contact feature.

19. A disc clamping system as claimed in claim 18, wherein the at least one contact feature is a portion of the spindle motor hub.

20. A disc clamping system as claimed in claim 19 wherein the contact feature is an annular raised surface on the spindle motor hub.

21. A disc clamping system as claimed in claim 20 wherein the contact feature is located radially between the central opening of the disc clamp and the screw holes in the disc clamp.

22. A disc clamping system as claimed in claim 20 wherein the contact feature is located radially between the screw holes of the disc clamp and the contact surface of the disc clamp.

23. A disc clamping system as claimed in claim 19 wherein the contact feature is a plurality of raised elements located circumferentially relative to the screw holes in the disc clamp.

24. A disc clamping system as claimed in claim 23 wherein the plurality of raised elements is located radially between the central opening of the disc clamp and the screw holes of the disc clamp.

25. A disc clamping system as claimed in claim 23 wherein the plurality of raised elements is located radially between the screw holes of the disc clamp and the contact surface of the disc clamp.

26. A disc clamping system as claimed in claim 18 wherein the at least one contact feature is a portion of the disc clamp.

27. A disc clamping system as claimed in claim 26 wherein the contact feature is an annular raised surface on the disc clamp.

28. A disc clamping system as claimed in claim 27 wherein the contact feature is located radially between the central opening of the disc clamp and the screw holes in the disc clamp.

29. A disc clamping system as claimed in claim 27 wherein the contact feature is located radially between the screw holes of the disc clamp and the contact surface of the disc clamp.

30. A disc clamping system as claimed in claim 26 wherein the contact feature is a plurality of raised elements located circumferentially relative to the screw holes in the disc clamp.

31. A disc clamping system as claimed in claim 30 wherein the plurality of raised elements is located radially between the central opening of the disc clamp and the screw holes of the disc clamp.

32. A disc clamping system as claimed in claim 30 wherein the plurality of raised elements is located radially between the screw holes of the disc clamp and the contact surface of the disc clamp.

33. A disc clamping system as claimed in claim 18 wherein the at least one contact feature comprises a spindle hub contact feature integral to the spindle motor hub and a disc clamp contact feature integral to the disc clamp.

34. A disc clamping system as claimed in claim 33 wherein the spindle hub contact feature is radially located between the central opening of the disc clamp and the screw holes of the disc clamp, and the disc clamp contact feature is radially located between the screw holes in the disc clamp and the contact surface of the disc clamp.

* * * * *